US010069881B2

(12) United States Patent
Savage et al.

(10) Patent No.: US 10,069,881 B2
(45) Date of Patent: *Sep. 4, 2018

(54) CUSTOMIZED INFORMATION SETUP, ACCESS AND SHARING DURING A LIVE CONFERENCE

(71) Applicant: AMX LLC, Richardson, TX (US)

(72) Inventors: Robert Savage, San Antonio, TX (US); Mark Smith, Fairview, TX (US); Paul Krizan, Sachse, TX (US)

(73) Assignee: AMX LLC, Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/201,425

(22) Filed: Jul. 2, 2016

(65) Prior Publication Data

US 2016/0315979 A1 Oct. 27, 2016

Related U.S. Application Data

(63) Continuation of application No. 14/297,855, filed on Jun. 6, 2014, now Pat. No. 9,413,796.

(60) Provisional application No. 61/832,616, filed on Jun. 7, 2013.

(51) Int. Cl.
*H04L 29/06* (2006.01)
*H04W 12/06* (2009.01)
*H04L 29/08* (2006.01)
*G06Q 10/10* (2012.01)

(52) U.S. Cl.
CPC ....... *H04L 65/403* (2013.01); *G06Q 10/1095* (2013.01); *H04L 29/06* (2013.01); *H04L 63/08* (2013.01); *H04L 67/06* (2013.01); *H04L 67/306* (2013.01); *H04L 67/325* (2013.01); *H04W 12/06* (2013.01)

(58) Field of Classification Search
CPC ....... H04L 65/403; H04L 63/08; H04L 29/06; G06Q 10/1095
USPC .......................................................... 726/4
See application file for complete search history.

(56) References Cited

U.S. PATENT DOCUMENTS

| | | | | |
|---|---|---|---|---|
| 2008/0091503 A1* | 4/2008 | Schirmer | ......... | G06Q 10/06315 705/7.19 |
| 2009/0083105 A1* | 3/2009 | Bhogal | .............. | G06Q 10/1095 705/7.19 |
| 2010/0146496 A1* | 6/2010 | Stoddart | .......... | H04N 21/41415 717/168 |
| 2010/0332959 A1* | 12/2010 | Mitchell | ........... | G06F 17/30056 715/202 |
| 2014/0282089 A1* | 9/2014 | West | ..................... | H04L 65/403 715/753 |

* cited by examiner

Primary Examiner — Jeffrey Pwu
Assistant Examiner — Samuel Ambaye

(57) ABSTRACT

A user device may access a remote conference management application and setup a conference customized for the user. For example, one method of operation may include transmitting a notification to a user device of an upcoming scheduled meeting time and receiving a confirmation that the scheduled meeting is a valid meeting time. The method may also include receiving at least one instruction from the user device regarding the meeting time, loading a data file sequence stored in a user account, and transmitting the data file sequence to a presentation management device.

20 Claims, 13 Drawing Sheets

CUSTOMIZED INFORMATION SETUP, ACCESS AND SHARING DURING A LIVE CONFERENCE

CROSS REFERENCE

This application is a continuation of U.S. application Ser. No. 14/297,855, filed Jun. 6, 2014, entitled CUSTOMIZED INFORMATION SETUP, ACCESS AND SHARING DURING A LIVE CONFERENCE, which claims priority to earlier filed Provisional Patent Application No. 61/832,616 filed on Jun. 7, 2013 entitled "ENZO", the entire contents of which are hereby incorporated by reference.

TECHNICAL FIELD

This application relates to conference information setup, sharing and authorization and more particularly to devices, applications and operations for setting up a conference profile for a particular user and sharing that information during the conference.

BACKGROUND

Conventionally, a conference, presentation or other social meeting requires a significant amount of planning even in the workplace. For example, a user may need to request a conference room via a manual attendance or schedule record or via a database application, invite others to attend the meeting, and prepare all the necessary presentation materials prior to the meeting. Next, the user must ensure the conference room has a projector, his or her files can be readily transported to the conference room computing device and loaded prior to the user's attending the meeting. Meetings are important to the furtherance of the workplace goals and projects, however, the various constraints for setting up the conference may dissuade users from holding a meeting which could be important and/or necessary to collaborate on current projects or goals.

SUMMARY

According to one example embodiment a method may include receiving a plurality of presentation data files from a user device, authenticating a user account associated with the user device, storing the presentation data files as a unique presentation, creating a scheduled presentation time, and transmitting a notification to the user device to confirm that presentation time.

According to another example embodiment an apparatus may include a receiver configured to receive a plurality of presentation data files from a user device, and a processor configured to authenticate a user account associated with the user device, store the presentation data files as a unique presentation, and create a scheduled presentation time, and may also include a transmitter configured to transmit a notification to the user device to confirm that presentation time.

According to another example embodiment a method may provide transmitting a notification to a user device of an upcoming scheduled meeting time, receiving a confirmation that the scheduled meeting is a valid meeting time, receiving at least one instruction from the user device regarding the meeting time, loading a data file sequence stored in a user account, and transmitting the data file sequence to a presentation management device.

According to yet another example embodiment an apparatus may include a transmitter configured to transmit a notification to a user device of an upcoming scheduled meeting time, a receiver configured to receive a confirmation that the scheduled meeting is a valid meeting time and to receive at least one instruction from the user device regarding the meeting time, a processor configured to load a data file sequence stored in a user account, and the transmitter is further configured to transmit the data file sequence to a presentation management device.

DETAILED DESCRIPTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as, packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Figure 1:
FIG. 1 illustrates a user display interface of the application according to example embodiments.

FIG. 1 illustrates a user display interface of the example application according to example embodiments. Referring to FIG. 1, the user interface 100 provides access to a series of options accessible via a user computing device. The user may desire to setup a conference agenda and have a corresponding set of presentation materials (e.g., audio, video, documents, POWER POINT® presentations, slides, live desktop access, Internet browser access, etc.) available for use during the presentation. In FIG. 1, the digital locker 110 may be an online cloud-based file repository that is linked to the user account to keep the user's presentation materials confidential and secure. The user may access the file repository and review, update, delete, modify, etc., the data files 112 that should be accessible for the live presentation.

The conference or presentation platform according to example embodiments may replace personal computers (PCs) in conference rooms and other common spaces with updated hardware and corresponding applications accessible via the user device, the remote servers and/or certain hardware devices inside the conference room. One example use case may include shortening the amount of time required for meetings to begin by making it simpler for users to access, retrieve and organize their virtual or computer-stored documents and materials prior to engaging an audience either in-person or via a live Internet connection.

Figure 2:
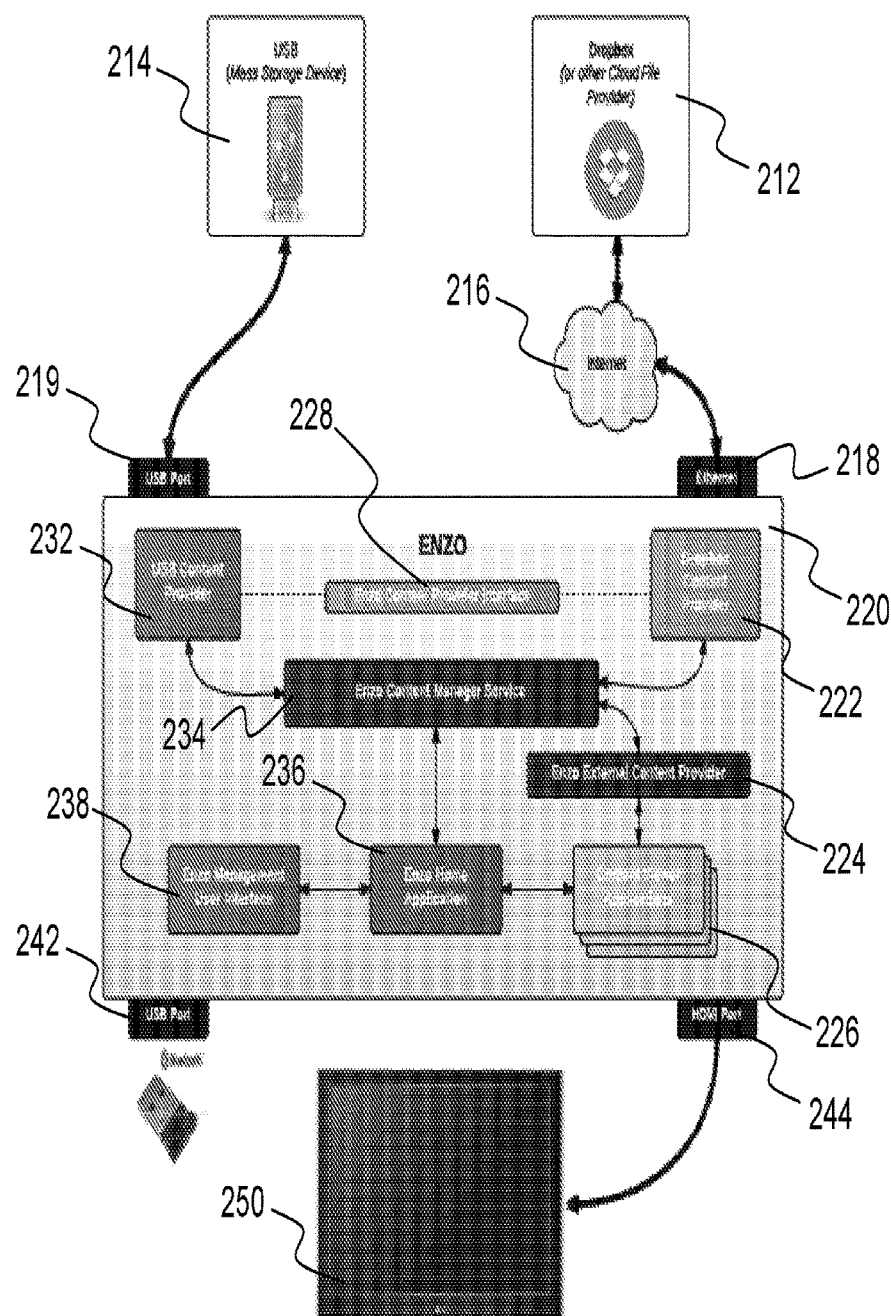
FIG. 2 illustrates an example hardware diagram of a conference device interface and corresponding network, according to an example embodiment of the present application.

FIG. 2 illustrates an example hardware diagram 200 of a conference device interface and corresponding network, according to an example embodiment of the present application. Referring to FIG. 2, the logic provides a main device responsible for managing the various peripheral conference room devices (e.g., audio/video presentation devices, projection devices, television, monitors, lighting, computing devices, etc.). The device may include a USB port 219 for accepting mass storage input devices 214. Also, wireless and/or wired network interface 218 may be compatible with Ethernet and wireless networking standards 802.11b, BLUETOOH, WIFI, etc. The Internet 216 may provide a network for sharing files or other information form a remote cloud source 212.

The device itself 220 may be located inside the conference room and may include a USB content provider 232 a cloud-based content provider 222 and interface 228. The content manager 234 may be responsible for queuing, synchronizing and/or establishing a sequence of information or files to share with the conference room devices. The external content provider 224 may transmit enable or disable signals to the various peripheral devices in the conference room. The management interface 238 may be operated by the user device via a management application 236 or dashboard operated by the user device. The content viewer applications 226 may be the applications which are used by the conference participants to view and access information related to an ongoing presentation or currently accessed data file. The user interface ports, such as the HDMI port 244 and USB port 242 may provide a direct connection to a peripheral device, such as monitor 250 for displaying a live presentation.

Figure 3:
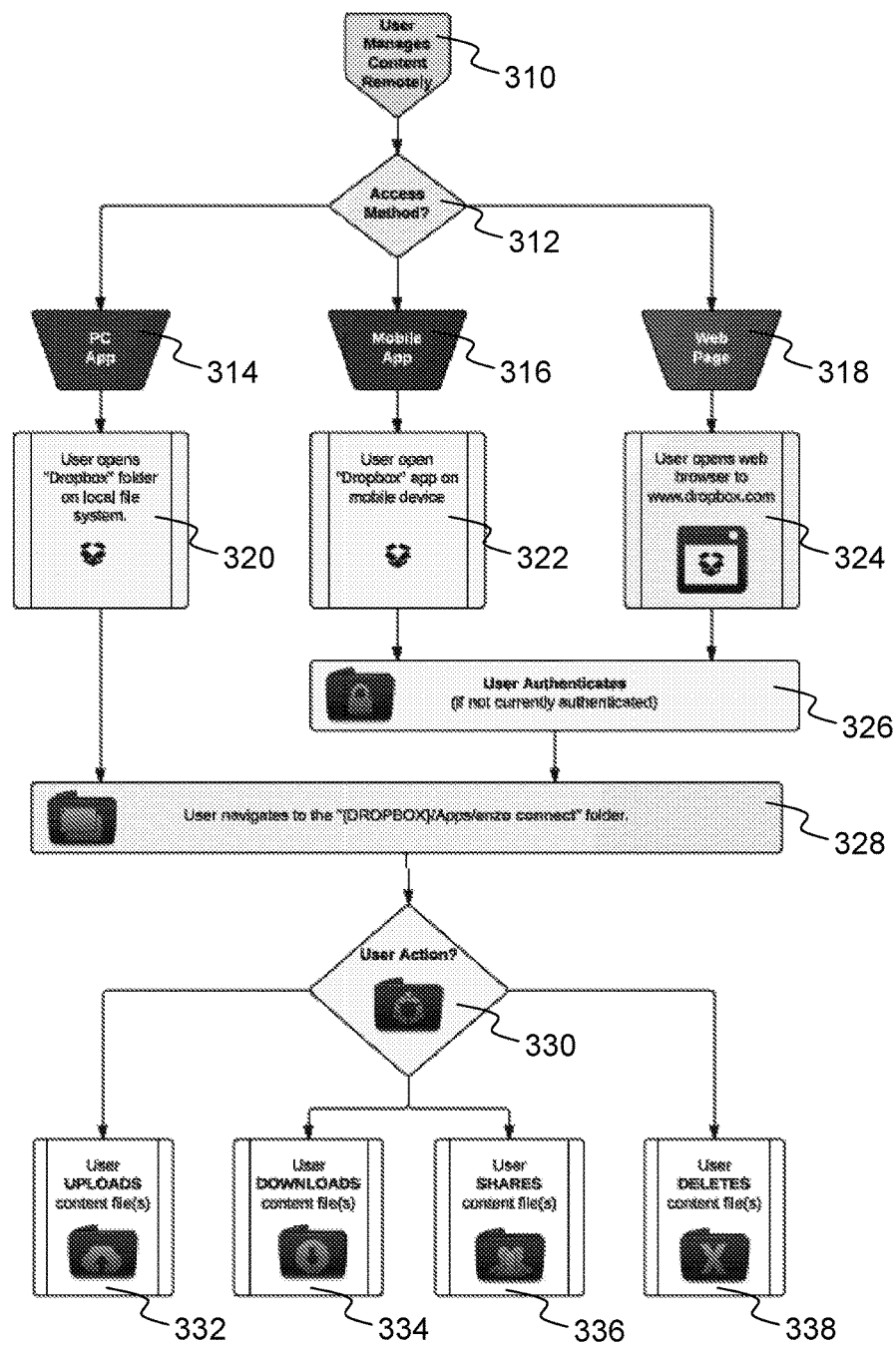
FIG. 3 illustrates an example logic diagram of a user accessing the conference application and communication system, according to an example embodiment of the present application.

FIG. 3 illustrates an example logic diagram 300 of a user accessing the conference application and communication system, according to an example embodiment of the present application. Referring to FIG. 3, the logic provides an example of a user managing content for the presentation remotely 310 via a user device and by uploading the information to a remote server (i.e., cloud server). The user may have an account that is used to authorize the user and organize the presentation materials as a separate conference or presentation based on a schedule or name which identifies that particular conference. The access method 312 may include a user computer application 314, a mobile application 316 and/or a web-based web page 318.

In operation, a user may open the cloud-based content provider folder 320 via the user device 322 and add, modify, delete the content of the remote server user account. The user may also open the application via a web browser 324. A user authentication operation 326 may be required prior to accessing any data. The user may then navigate the contents of the online account 328 and perform an action 330. The user may upload data 332, download data 334, share files 336 and/or delete files 338.

Figure 4A:
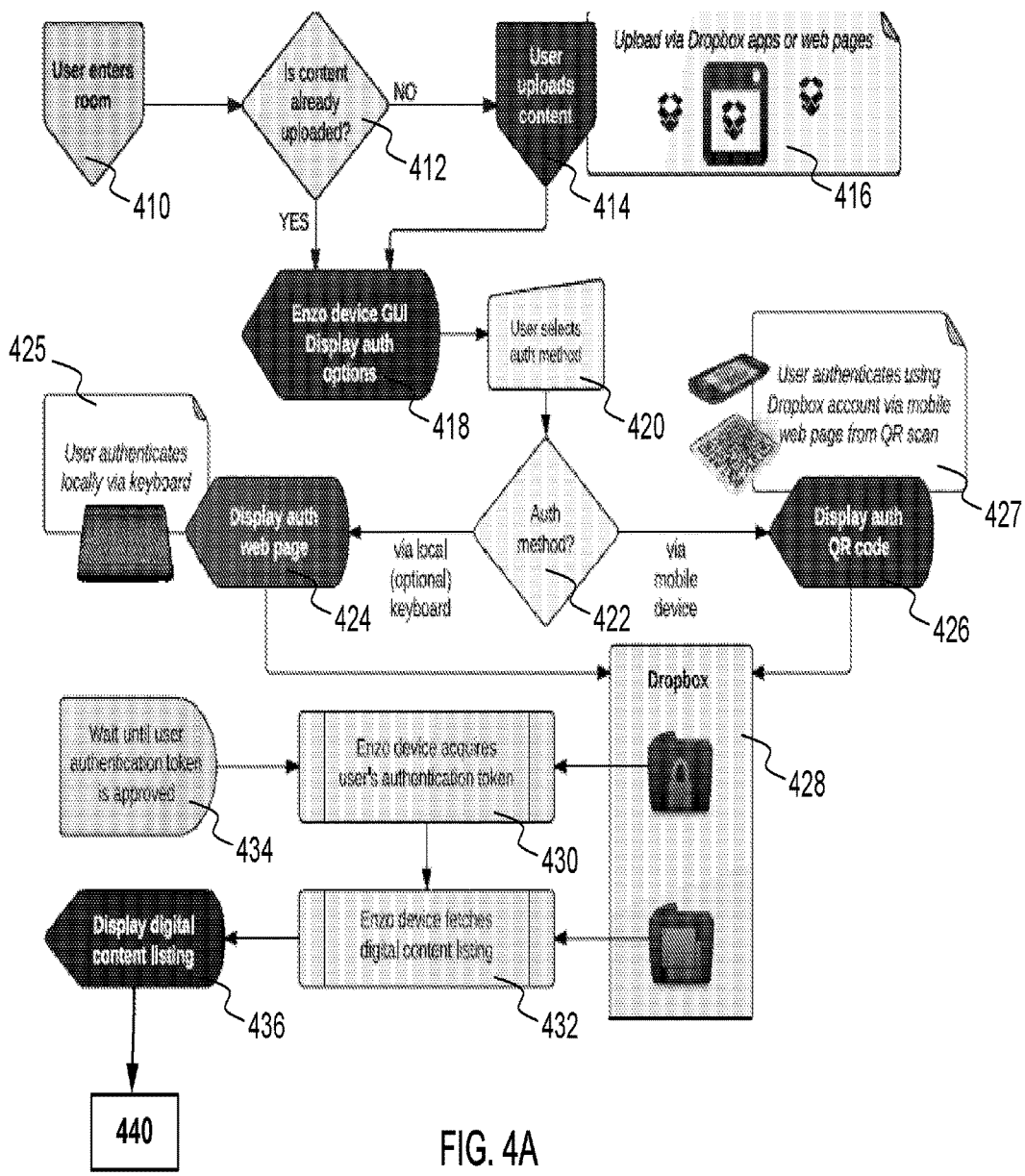
FIG. 4A illustrates an example logic diagram of a user accessing the conference application, according to an example embodiment of the present application.

FIG. 4A illustrates an example logic diagram of a user accessing the conference application, according to an example embodiment of the present application. Referring to FIG. 4A, the logic diagram 400 includes an example presentation including a user entering a room 410 and identifying whether content is uploaded 412, if so then the conference device user interface may display an authorization page 418 which a user may select one or more ways to authorize the application 420. For example, the user may select a method of authorization 422 which may include a web page being displayed 424 via a user keyboard 425 or a mobile device which may invoke a QR code authorization interface 426 permitting the user to scan the code via their mobile device 427 which may identify the device and transmit an authorization code to the remote cloud server. If the user content is already uploaded 414 then the content may be sent to the remote serer 416. The cloud-based content provider account or application 428 may require a user access token 430 or a digital content listing command 432 prior to displaying any digital content 436 or to wait until an authentication token is approved 434.

Figure 4B:
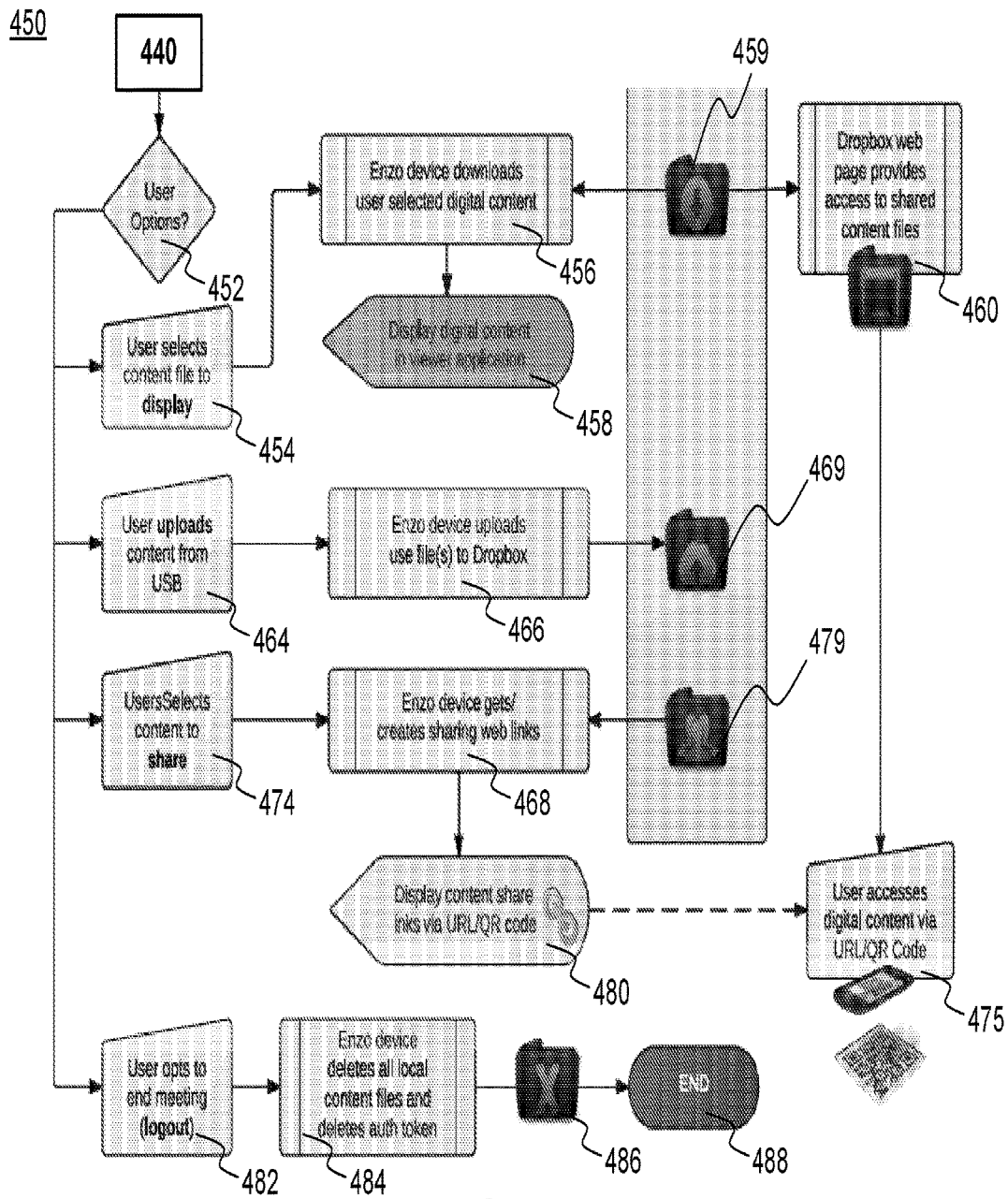
FIG. 4B illustrates another example logic diagram as a continuation of the user accessing the conference application, according to an example embodiment of the present application.

The continuing set of operations 440 are included on the logic diagram 450 of FIG. 4B. The user options 452 may include a user selecting content files to display 454, content to be uploaded from the USB device 464, and/or a user may select content to share accordingly 474. The conference device may download the user selected content automatically 456 and access the remote source 459 for the content. The remote content server may provide access to shared content files 460 and the user may access the content 475 accordingly. The digital content may be displayed 458 in a viewer application. The conference device may also upload 466 any needed files to the cloud 469 for storage. The device may also create a shared web link 468 from the content folder 479. The content can be shared 480 via web links or QR code access options. Once the meeting is finished, the user may end the meeting 482 and the conference device 484 may delete all local content files downloaded for the meeting and synchronize with the remote server to store the meetings content, notes and other actions for secure access to the meeting content at a later time 484. The files to be deleted may be marked 486 and the process may end 488.

Figure 5A:
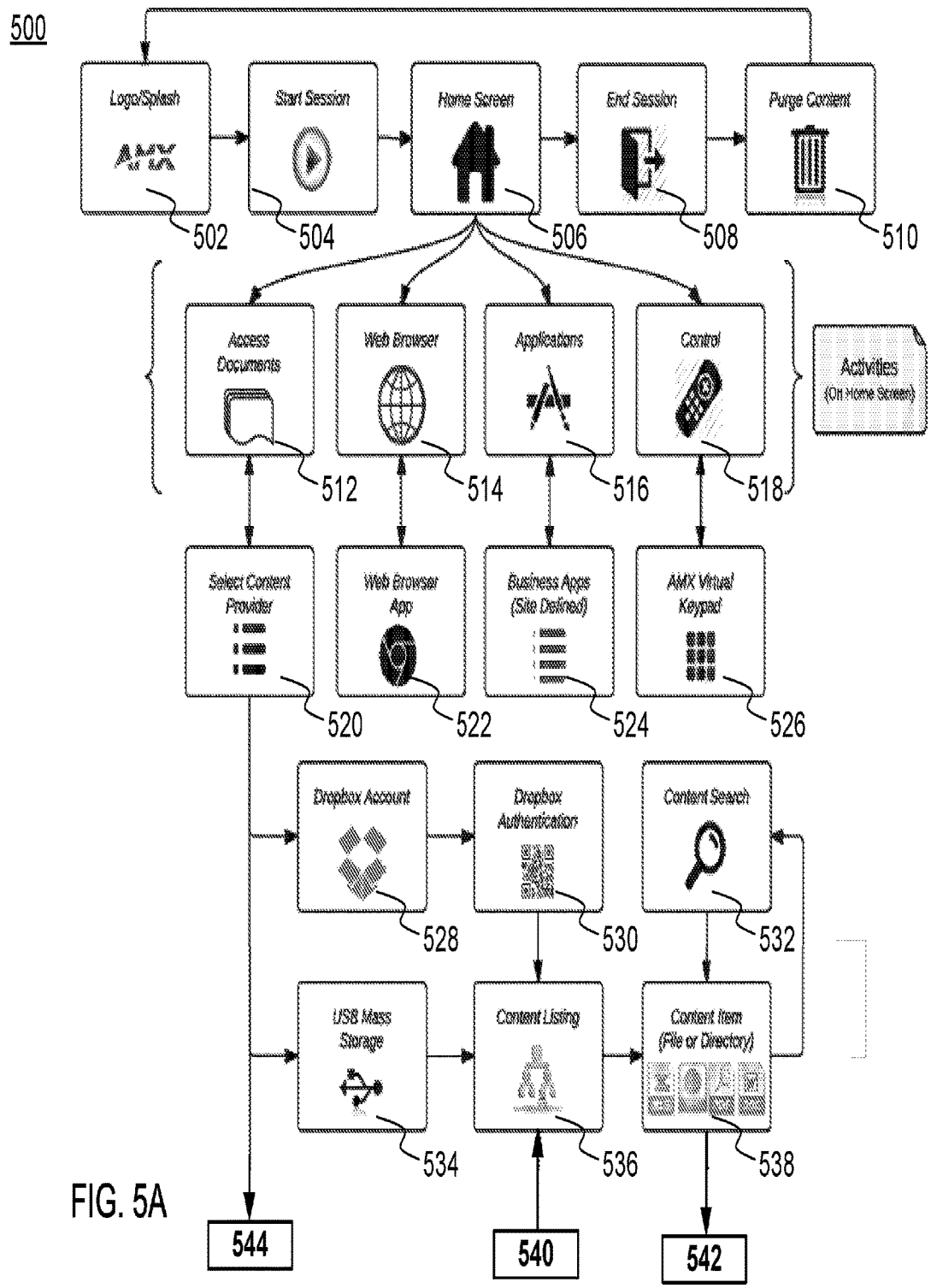
FIG. 5A illustrates an example logic and flow diagram of a series of user options available via the conference application, according to an example embodiment of the present application.
Figure 5B:
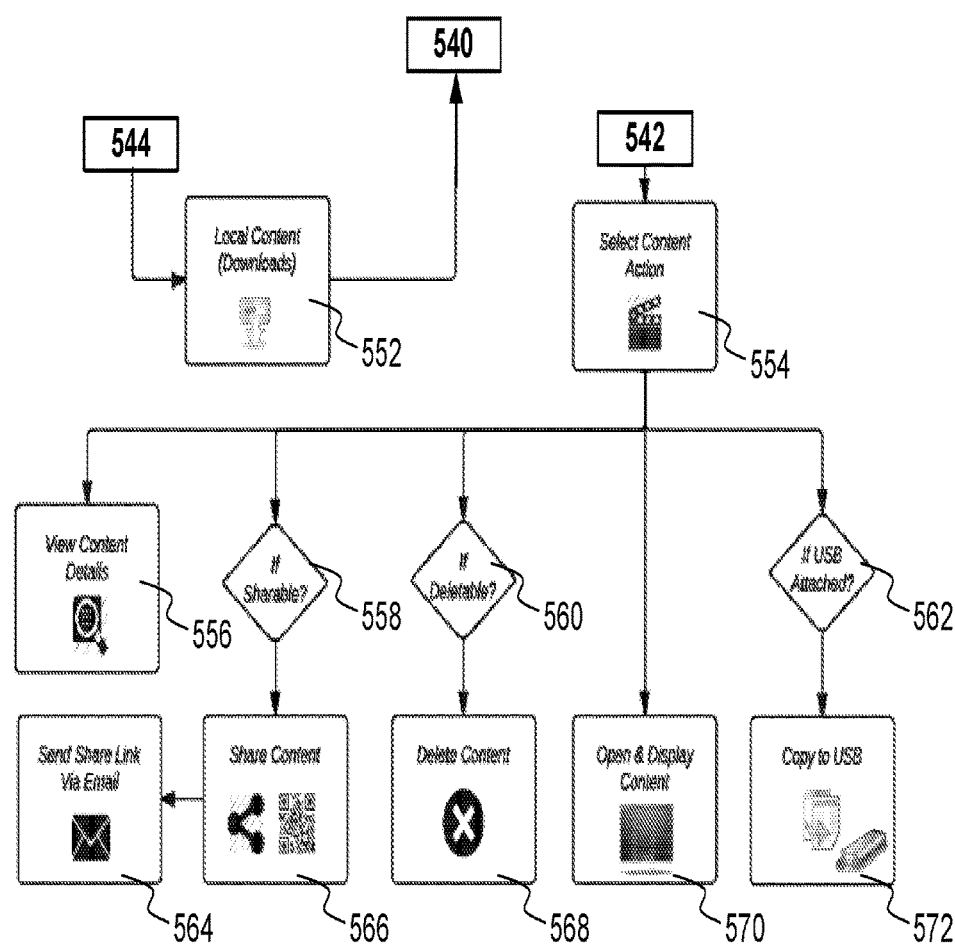
FIG. 5B illustrates an example logic and flow diagram continuation of the series of user options available via the conference application, according to an example embodiment of the present application.

FIG. 5A illustrates an example logic and flow diagram 500 of a series of user options available via the conference application, according to an example embodiment of the present application. Referring to FIG. 5A, the application may initiate with a logo insert 502, a start screen 504, a home screen 506 and in the end of a session an end session 508 and a purge content option 510. The home screen 506 may provide access to documents 512 that are linked to a content provider 520, a web browser 514 linked to a web browser application 522, various file and presentation access applications 516 linked to business applications 524 and/or a control menu 518 controlled by a virtual keypad 526. The content provider may link to a cloud-based content provider account 528 which is accessed via a corresponding authentication menu 530. Also, content may be accessed via a local storage device (i.e., USB 534). The content listing 536 may include a list of set of documents used for presentation purposes. The content items or directories 538 may be accessed to select a file via a content search function 532. The process continues via operations 540, 542 and 544 with respect to FIG. 5B FIG. 5B illustrates an example logic and flow diagram continuation 550 of the series of user options available via the conference application, according to an example embodiment of the present application. Local content 552 may be accessed to load during the presentation along with a content action 554, such as load, execute, stream, present, display, etc. The content details may be viewed for background information 556 and a determination may be made as to whether the information is sharable 558, deletable 560 or if a USB device is attached 562. The content may be copied and shared if detected 572 and/or opened and displayed 570 depending on the action taken. The content may also be deleted 568 and/or shared 566 via a share link 564.

Figure 6A:
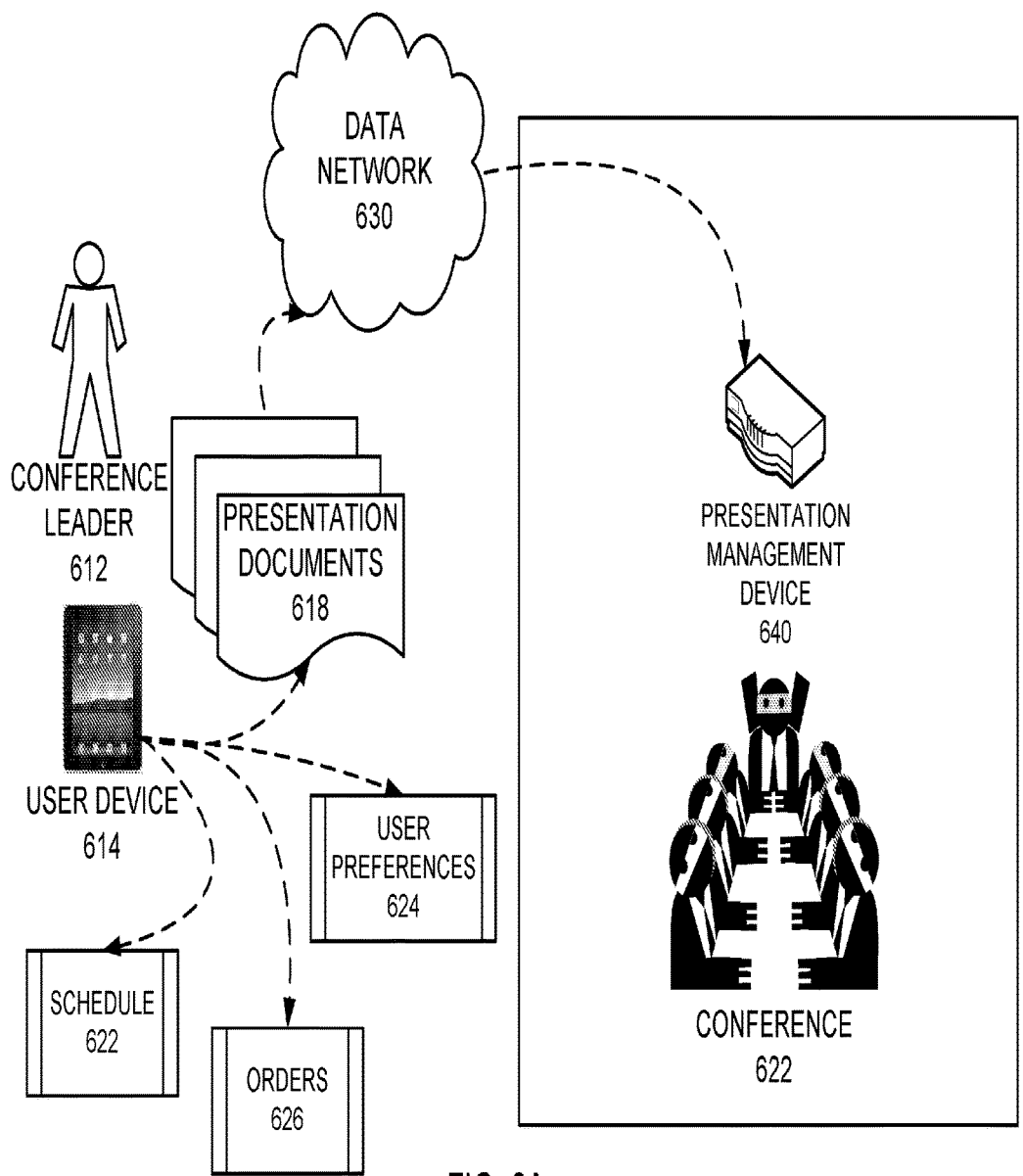
FIG. 6A illustrates a network configuration of a conference setup according to example embodiments.

FIG. 6A illustrates a network configuration of a conference setup according to example embodiments. Referring to FIG. 6A, the content created and intended to be used for an upcoming presentation may be setup and shared with a cloud server service in the example network configuration 600. The conference leader 612 may have a user account that can be accessed and setup to receive content files and other information necessary to setup, schedule, execute, and conduct a meeting in a conference room 622. The user device 614 may initiate documents in a sequence 618, and may also have predetermined user preferences 624 (e.g., lighting preferences, meal order preferences, user computing device setup preferences, scheduling preferences, attendee preferences, etc.) which can be applied to automatically setup a conference and apply the user preferences. The user may also initiate a schedule 622 and any orders that are required 626 (e.g., equipment orders, food and beverage orders, attendance requests, etc.). All the conference data may be linked to a cloud service and storage account accessible via a data network 630. The presentation management device 640 may be notified the day of the scheduled conference and may receive the user account data and files for subsequent presentation purposes.

Figure 6B:
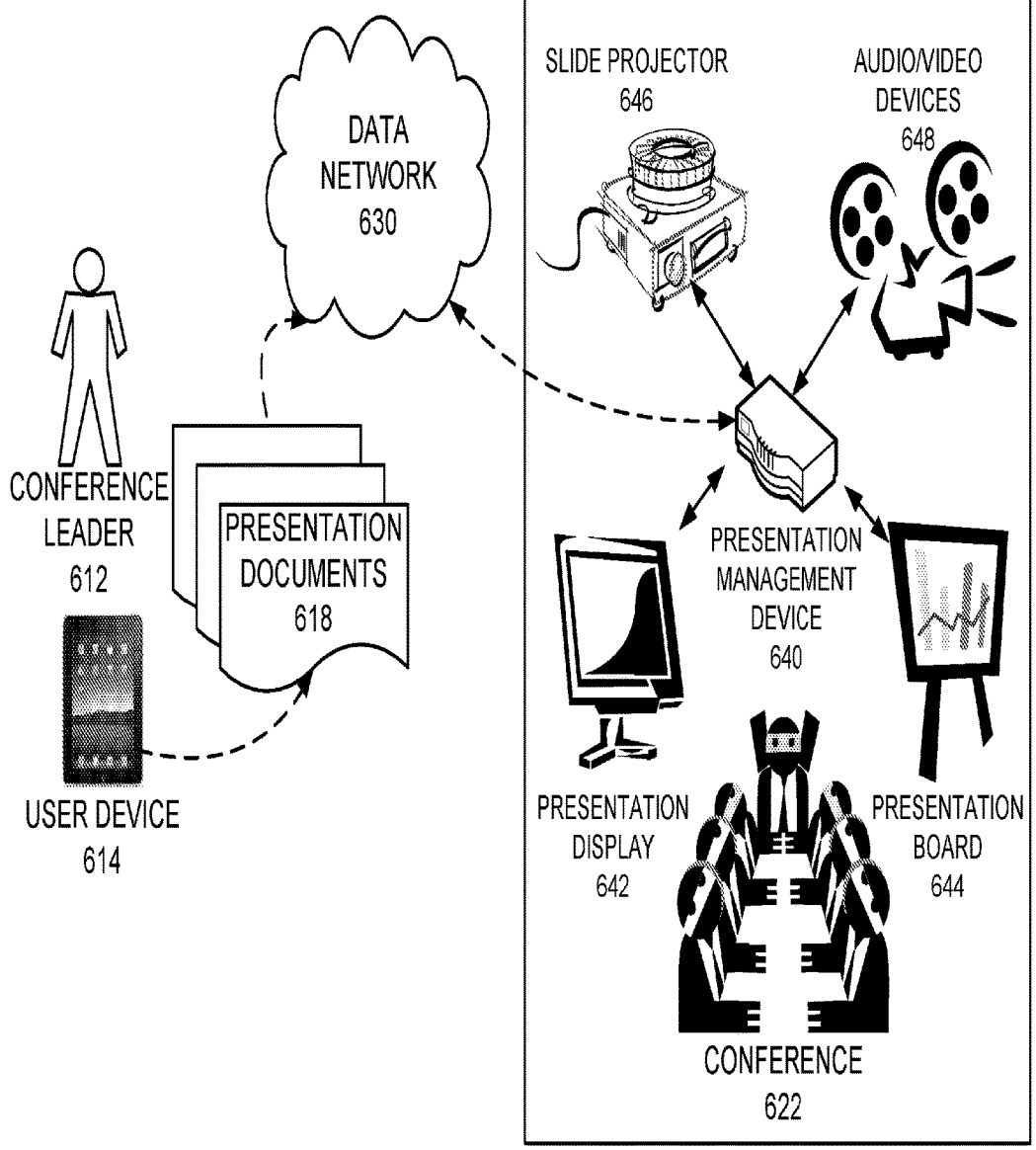
FIG. 6B illustrates a network configuration of a live conference according to example embodiments.

FIG. 6B illustrates a network configuration of a live conference according to example embodiments. Referring to FIG. 6B, the configuration 650 includes the presentation management device 640 in operation during a conference. The device commands associated with the presentation data files may indicate that a slide projector 646, a presentation display 642, an electronic presentation board 644 and/or any audio/video devices 648 are initiated and ready to share the content associated with the presentation sequence. For example, one device may be setup to share a data file as a first command is identified as part of the sequence, a second command may be used to initiate a second device at a later time or once a trigger is identified (e.g., the POWERPOINT presentation is complete—commence audio/video device operation and file execution). Once the file sequence is complete, the information stored on the presentation management device 640 may be purged from memory to avoid any unexpected access attempts by others after the presentation is complete. Also, other devices which may be controlled include lighting, audio producing devices, or other special effect generating devices (e.g., wind, sound, movement, vibration, mist, scent, etc.) which can be part of the presentation timeline, control and output of the presentation as it occurs.

Figure 7A:
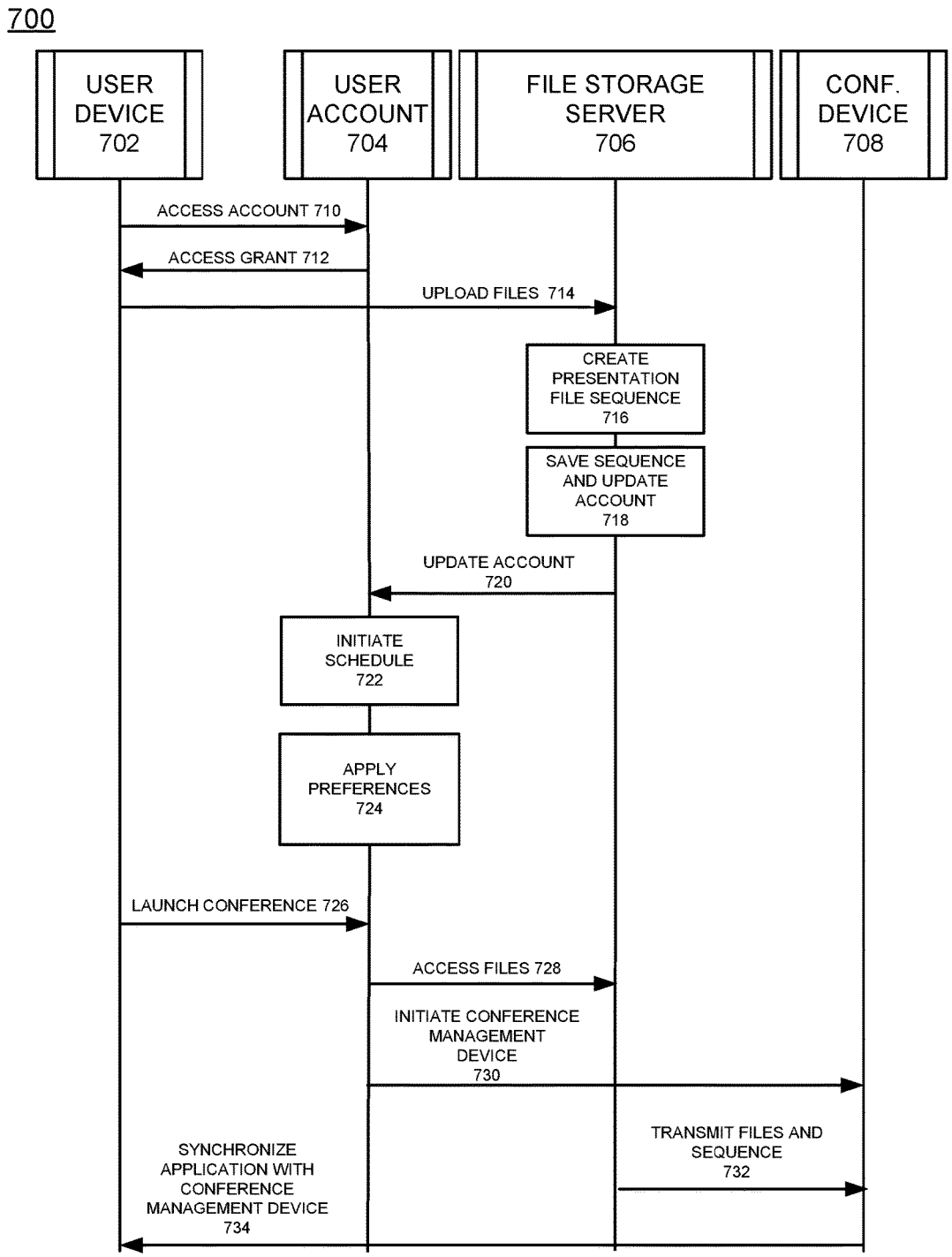
FIG. 7A illustrates a system diagram of the operations conducted during the conference setup according to example embodiments.

FIG. 7A illustrates a system diagram of the operations conducted during the conference setup according to example embodiments. Referring to FIG. 7A, the system diagram 700 includes an example of a presentation setup and corresponding access function. Referring to FIG. 7A, the user device 702 may initiate an account access operation 710 to the user account 704 which may be a presentation application operated on the user device 702 and/or the file storage server 706 (i.e., cloud server). The user may receive an access grant 712 and then proceed to upload data files 714 to be shared during the presentation along with updated preferences, requests or other commands which could customize the presentation. The file server 706 may create a presentation file sequence 716 and save the sequence and update the user account 718 to reflect the changes. The user account 704 may be updated by receiving a confirmation message 720.

The user account 704 may also be used to initiate a schedule 722 and apply the user preferences 724 as a simple way to launch a presentation and maximize user preferences autonomously without having to customize every feature manually. The conference can be launched 726 by the user device 702 and files may be accessed 728 from the file server 706. The conference management device 708 may be notified of the upcoming conference 730 and may receive files and the presentation sequence 732 which may also be synchronized 734 with the user management device 702 which can operate as a remote control or driving tool to initiate data file access, presentation, and other commands related to the presentation sequence.

Figure 7B:
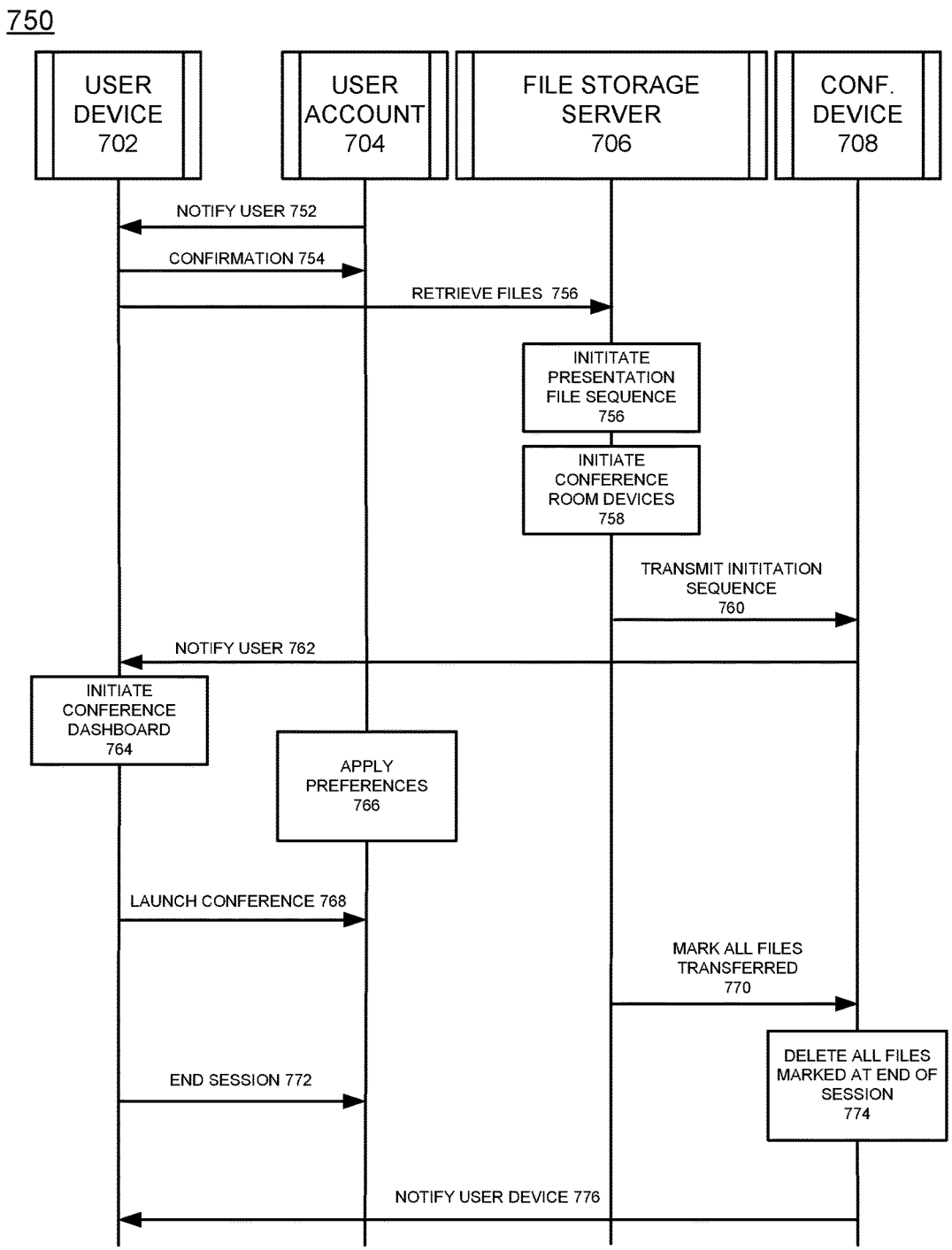
FIG. 7B illustrates a system diagram of the operations conducted during the live conference according to example embodiments.

FIG. 7B illustrates a system diagram of the operations conducted during the live conference according to example embodiments. Referring to FIG. 7B, the system sequence of commands 750 correlates to the conference execution and finalization processes that result from the conference being conducted. In operation, the user is notified 752 of the upcoming scheduled meeting and may confirm 754 the time or modify the time depending on his or her preference. The confirmation triggers a file retrieval operation 756 which also initiates the file sequence 756 and the conference room device commands 758 necessary to achieve the meeting goals. The sequence and file information 760 may be transferred to the conference device 708 to locally store the information needed to conduct the meeting. A user may be notified 762 of the upcoming meeting as the meeting is about to begin and the notification may trigger the meeting application on the user's device, such as a dashboard or control panel 764 for operating the meeting. The user preferences 766 may be applied at any time so all the meeting events are customized according to the user's known preferences. The conference may then be launched 768 and all files which are shared with the conference may be marked for deletion 770 once the end of presentation flag is detected at the end of the presentation sequence of files 774. The end of session may be manually identified 772 by the use device as well. The finalization of the presentation and the file deletion may be performed and notified 776 to the user device 702.

Figure 8:
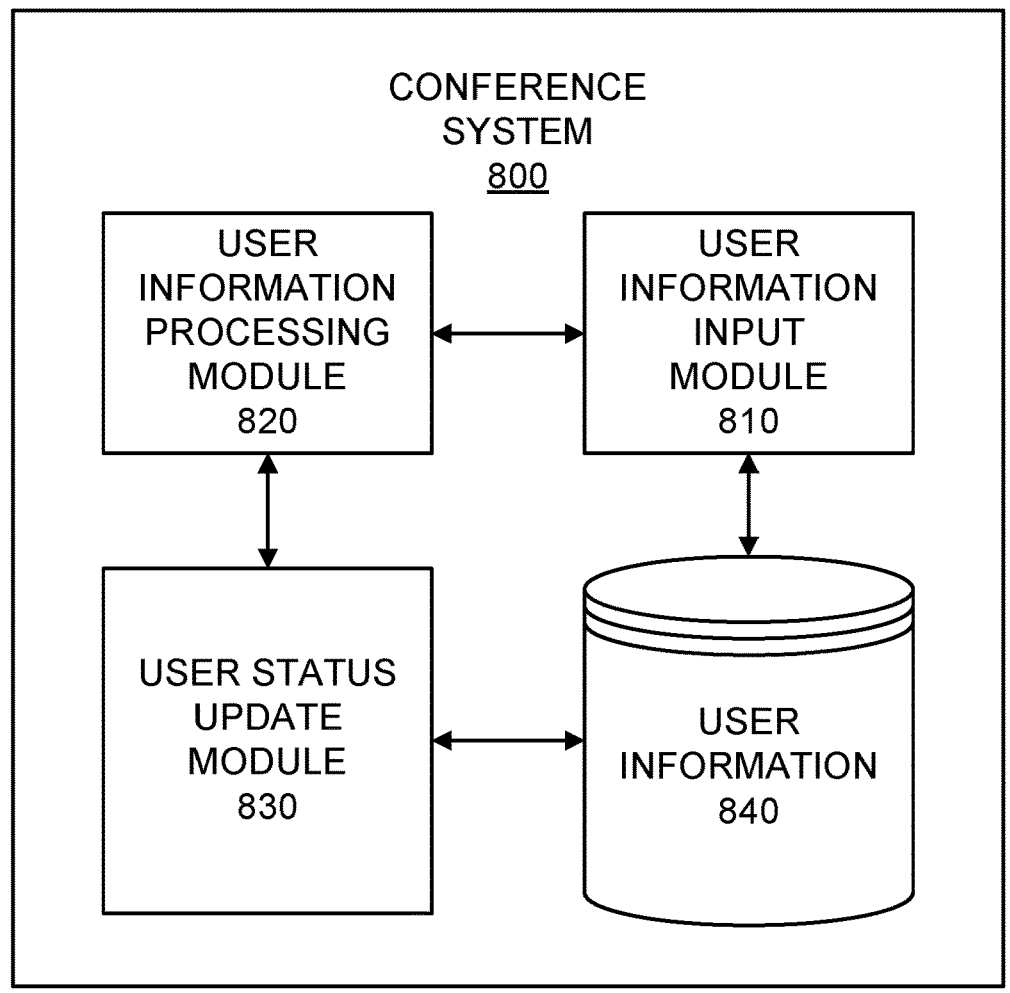
FIG. 8 illustrates an example system device(s) configuration according to example embodiments.

FIG. 8 illustrates an example system device(s) configuration according to example embodiments. Referring to FIG. 8, the system 800 includes a conference device 800 that includes a receiver or user information input module 810 that is configured to receive a number of presentation data files from a user device that is attempting to setup and execute a presentation. The user information processing module 820 may authenticate a user account associated with the user device, store the presentation data files as a unique presentation and create a scheduled presentation time by applying user preferences to the meeting setup procedure. The user update module 830 may be used to transmit a notification to the user device to confirm that presentation time selected. All information related to the user and the presentation may be stored in the user information or profile database 840.

Thereafter, a sequence between the presentation data files may be created and each subsequent presentation data file in the sequence may be selected as a previous presentation data file in the sequence has ended during a live presentation. The files may have markers or links to the other files so the sequence is properly ordered and subsequent files in the sequence can be called and executed in the order they are needed. Certain commands may be setup and stored in a unique presentation file or folder corresponding to a number of different presentation devices in communication with a main presentation management device. The commands dictate which device should be accessed and what file or data should be presented by that particular device and at correct times. The commands may then be transmitted to the presentation management device and each of the presentation devices may be triggered to begin operating once the various commands are received. The presentation devices may be a slide projector, a video projector, an overhead projector, and a computing device including computing devices for each participant or one or two main devices with displays depending on how the conference network is setup. When the user is authenticated the user account may be accessed and the authorization may be performed via a quick response (QR) code being scanned by the user device and presented via the conference management device. After being authenticated, a presentation management application may be launched on the user device.

In another example embodiment, the conference application may be accessed and the conference may be initiated and completed according to a series of operations. For instance, the system 800 may provide transmitting a notification to a user device of an upcoming scheduled meeting time and receiving a confirmation that the scheduled meeting is a valid meeting time. The system may also receive one or more instructions from the user device regarding the meeting time and then perform loading a data file sequence stored in the user account, and transmitting the data file sequence to a presentation management device associated with the conference room.

During the conference initiation, the user account may be authorized and the data file sequence may be sent to the presentation management device. The data file sequence may be initiated by communicating with at least one presentation device managed by the presentation management device. Thereafter, a number of commands may be transmitted to the presentation management device, and the presentation device may be triggered to begin operating once the commands are received. The system may also identify an end of presentation flag associated with an end of the data file sequence and initiate a delete command responsive to identifying the end of presentation flag which deletes the data file sequence.

Once the presentation sequence is shared with the management device, a timeline or presentation timeline may be established for a series of presentation device actions to occur over a fixed time interval. For example, a one hour presentation may have a known timeline of 60 minutes with certain devices set to begin operation at various time flags or time instances throughout that one hour period. In one example, the lights may be dimmed at 10 minutes into the presentation to initiate a video file transition from the ongoing slide display during the first 10 minutes. The time instance may be a flag that is recognized once the 60 minute time interval begins. Each time instance may be set to trigger a presentation device throughout the time period and may be known at the onset of the presentation and the beginning of the timeline sequence which coincides with the presentation materials. For instance, a 60 minute presentation may have 3 time instances which occur at the end of 12, 15 and 14 minute time intervals which begin exactly after the last time instance has occurred. The first time instance may include a dimming of lights at 12 minutes into the presentation, the second time instance may occur 15 minutes after the first 12 minutes and may cause audio to play or video to begin playing on the display interface of a projection device. Then 14 minutes after the second instance, the third and final instance may cause the lights to go back on and music to play, each of these cues and results may be used to help the presenter stay on time and offer maximum efficiency, creativity and use of the various presentation devices.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 9 illustrates an example network element 900, which may represent any of the above-described network components, etc.

Figure 9:
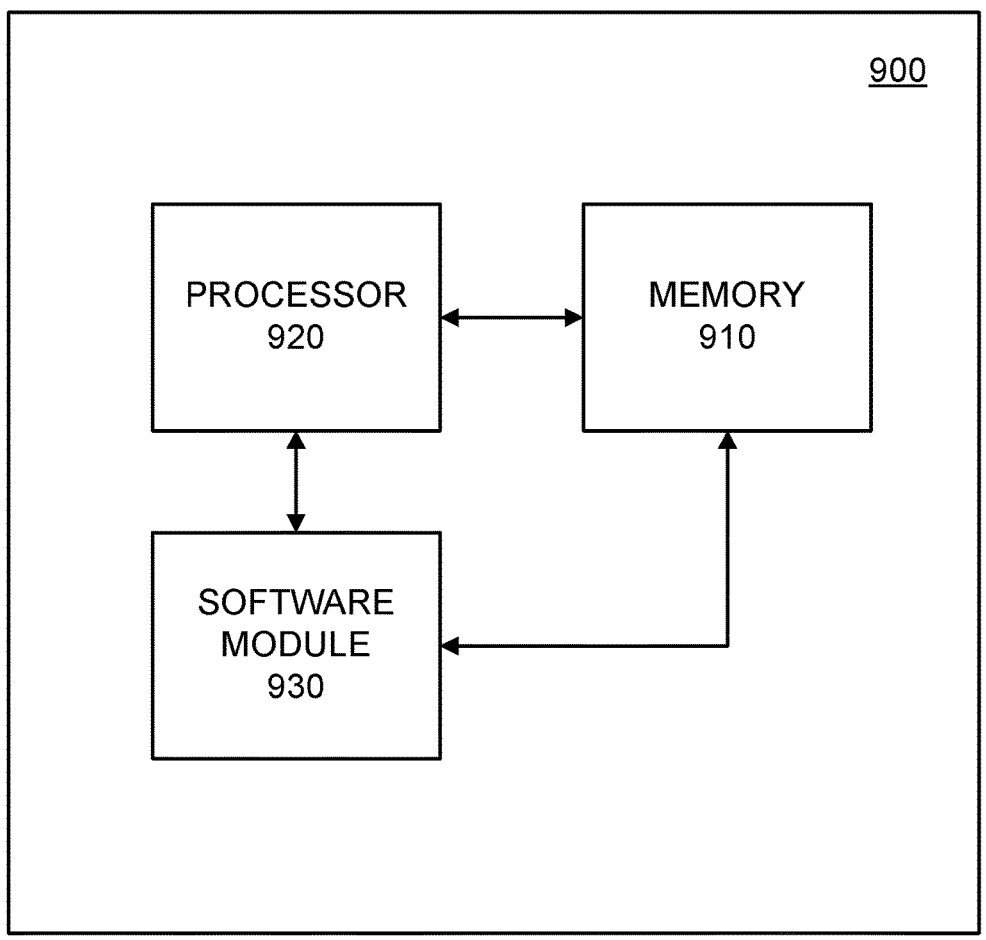
FIG. 9 illustrates an example network entity device configured to store instructions, software, and corresponding hardware for executing the same, according to example embodiments of the present application.

As illustrated in FIG. 9, a memory 910 and a processor 920 may be discrete components of the network entity 900 that are used to execute an application or set of operations. The application may be coded in software in a computer language understood by the processor 920, and stored in a computer readable medium, such as, the memory 910. The computer readable medium may be a non-transitory computer readable medium that includes tangible hardware components in addition to software stored in memory. Furthermore, a software module 930 may be another discrete entity that is part of the network entity 900, and which contains software instructions that may be executed by the processor 920. In addition to the above noted components of the network entity 900, the network entity 900 may also have a transmitter and receiver pair configured to receive and transmit communication signals (not shown).

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the system of FIG. 5 can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the invention, as generally described and illustrated in the figures herein, may be arranged and designed in a wide variety of different configurations. Thus, the detailed description of the embodiments is not intended to limit the scope of the invention as claimed, but is merely representative of selected embodiments of the invention.

One having ordinary skill in the art will readily understand that the invention as discussed above may be practiced with steps in a different order, and/or with hardware elements in configurations that are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   loading, by a server, a presentation that includes a data file sequence stored in a user account;
   transmitting, by the server, the data file sequence and instructions to a presentation management device, wherein the instructions indicate which of a plurality of presentation devices managed by the presentation management device are to collaboratively execute the presentation; and
   transmitting, by the server, at least one command controlling the plurality of presentation devices to the presentation management device, the at least one command including timeline instructions identifying two presentation devices and different respective future intervals of time at which the two presentation devices are scheduled to begin presenting, and data instructions identifying respective data files to be presented by the two presentation devices at the different respective future intervals of time.

2. The method of claim 1, further comprising:
authorizing the user account; and
transferring the data file sequence to the presentation management device.

3. The method of claim 1, further comprising initiating the data file sequence by communicating with at least one presentation device among the plurality of presentation devices managed by the presentation management device.

4. The method of claim 1, further comprising at least one of:
transmitting a notification to a user device of an upcoming scheduled meeting time;
receiving a confirmation that the scheduled meeting is a valid meeting time; and
receiving at least one instruction from the user device regarding the meeting time.

5. The method of claim 1, wherein the plurality of presentation devices comprise at least two of a slide projector, a video projector, an overhead projector, and a computing device.

6. The method of claim 1, further comprising identifying an end of presentation flag associated with an end of the data file sequence.

7. The method of claim 6, further comprising:
initiating a delete command responsive to identifying the end of presentation flag; and
deleting the data file sequence.

8. An apparatus, comprising:
a transmitter; and
a processor configured to load a presentation that includes a data file sequence stored in a user account;
wherein the transmitter is configured to:
transmit the data file sequence and instructions to a presentation management device, wherein the instructions indicate which of a plurality of presentation devices managed by the presentation management device are to collaboratively execute the presentation; and
transmit at least one command controlling the plurality of presentation devices to the presentation management device, the at least one command including timeline instructions identifying two presentation devices and different respective future intervals of time at which the two presentation devices are scheduled to begin presenting, and data instructions identifying respective data files to be presented by the two presentation devices at the different respective future intervals of time.

9. The apparatus of claim 8, wherein the processor is further configured to authorize the user account, and transfer the data file sequence to the presentation management device.

10. The apparatus of claim 8, wherein the processor is further configured to initiate the data file sequence by communicating with at least one presentation device among the plurality of presentation devices managed by the presentation management device.

11. The apparatus of claim 8, comprising a receiver, wherein:
the transmitter is configured to transmit a notification to a user device of an upcoming scheduled meeting time; and
the receiver is configured to receive a confirmation that the scheduled meeting is a valid meeting time and to receive at least one instruction from the user device regarding the meeting time.

12. The apparatus of claim 8, wherein the plurality of presentation devices comprise at least two of a slide projector, a video projector, an overhead projector, and a computing, device.

13. The apparatus of claim 8, wherein the processor is further configured to identify an end of presentation flag associated with an end of the data file sequence.

14. The apparatus of claim 13, wherein the processor is configured to initiate a delete command responsive to identifying the end of presentation flag and delete the data file sequence.

15. A non-transitory computer readable storage medium configured to store instructions that when executed cause a processor to perform:
loading a presentation that includes a data file sequence stored in a user account;
transmitting the data file sequence and instructions to a presentation management device, wherein the instructions indicate which of a plurality of presentation devices managed by the presentation management device are to collaboratively execute the presentation; and
transmitting at least one command controlling the plurality of presentation devices to the presentation management device, the at least one command including timeline instructions identifying two presentation devices and different respective future intervals of time at which the two presentation devices are scheduled to begin presenting, and data instructions identifying respective data files to be presented by the two presentation devices at the different respective future intervals of time.

16. The non-transitory computer readable storage medium of claim 15, wherein the processor is further configured to perform:
authorizing the user account; and
transferring the data file sequence to the presentation management device.

17. The non-transitory computer readable storage medium of claim 15, wherein the processor is further configured to perform initiating the data file sequence by communicating with at least one presentation device among the plurality of presentation devices managed by the presentation management device.

18. The non-transitory computer readable storage medium of claim 15, wherein the processor is further configured to perform at least one of:
transmitting a notification to a user device of an upcoming scheduled meeting time;
receiving a confirmation that the scheduled meeting is a valid meeting time; and
receiving at least one instruction from the user device regarding the meeting time.

19. The non-transitory computer readable storage medium of claim 15, wherein the plurality of presentation devices comprise at least two of a slide projector, a video projector, an overhead projector, and a computing device.

20. The non-transitory computer readable storage medium of claim 15, wherein the processor is further configured to perform:
identifying an end of presentation flag associated with an end of the data file sequence;

initiating a delete command responsive to identifying the end of presentation flag; and deleting the data file sequence.

* * * * *